United States Patent [19]

Hattori et al.

[11] Patent Number: 5,075,131

[45] Date of Patent: Dec. 24, 1991

[54] METHOD FOR PRESERVATION TREATMENT OF WOOD

[75] Inventors: Nobuaki Hattori, Tama; Kuniharu Yokoo, Nishinomiya, both of Japan

[73] Assignee: Fuyo Lumber Sales Co., Ltd., Osaka, Japan

[21] Appl. No.: 492,587

[22] Filed: Mar. 12, 1990

[30] Foreign Application Priority Data

Mar. 10, 1989 [JP] Japan .................................. 1-58191

[51] Int. Cl.[5] ......................... B05D 3/02; B05D 3/12; B32B 35/00

[52] U.S. Cl. .................................. 427/45.1; 427/53.1; 427/140; 427/291; 427/397; 156/643

[58] Field of Search ..................... 427/45.1, 53.1, 140, 427/291, 386, 393, 393.1, 393.3, 397, 275, 308, 317, 325; 156/643

[56] References Cited

U.S. PATENT DOCUMENTS

| | | | |
|---|---|---|---|
| 2,631,109 | 3/1953 | Gard | 427/45.1 |
| 3,808,030 | 4/1974 | Bell | 427/355 |
| 4,071,637 | 1/1978 | Dittrich | 427/325 |
| 4,877,070 | 10/1989 | Hayashi | 427/393 |

*Primary Examiner*—Shrive Beck

*Assistant Examiner*—Marianne L. Padgett

[57] ABSTRACT

A method for preservation treatment of wood comprises the steps of radiating a laser beam on a part of the surface of the wood at the least to form small holes therein, impregnating the wood with a preservative, and then applying high frequency waves to the wood to dry it by dielectric heating.

2 Claims, No Drawings

METHOD FOR PRESERVATION TREATMENT OF WOOD

BACKGROUND OF THE INVENTION

1. Field of the Invention

The present invention relates to a method for preservation and/or modification treatment of wood. More particularly, it relates to a method for making wood moth-resistant, moisture-resistant, and/or fire-resistant, through impregnation of the fibers with chemicals such as preservatives, mothproofing agents, fire retardant, modifiers including polyethylene glycol, synthetic resins, and the like.

2 Description of the Prior Art

Development of methods for preservation treatment of wood has increased usefulness of wood as a structural material for interior construction such as interior walls, flooring and the like. The preservation treatment is generally carried out by dipping wood in a preservative solution, accompanied by vacuum impregnation and/or pressure impregnation. It is, however, difficult to produce uniformly treated wood because of differences in the rate of penetration of a preservative between two parts of the main stem of a tree, i.e., the outer part (sapwood portion) and the inner core (heartwood portion).

Penetration of preservative may be improved by incising, i.e., by mechanically making spaced slitlike cuts in the outer layer of wood with an incising machine. The incising is not so effective for large logs or square timber of with large size as it can only provide shallow holes. Since the heartwood is generally penetrated with the preservative at a low rate as compared with the sapwood, the preservation treatment of heartwood takes a long period of time even if the wood to be treated has been incised before preservation treatment.

The preservation treatment of wood is generally accomplished by artificial drying procedures such as heating the wood with steam or hot air, and dielectric heating resulting from application of high frequency waves, to finish the drying process within a short time. The artificial procedures increase the rate of drying as compared with natural air drying, but there are some problems awaiting a solution. For example, the steam or hot-air drying is accompanied by rapid surface drying, and heating due to conduction of heat, so that the water in the outer portion of the wood is discharged easily by evaporation. However, the moisture movement in the inner portion is very low as compared with that in the outer portion, so that a difference in the moisture content between the outer and inner portions of the wood is produced during drying, which may cause surface cracking, inter checks or other defects during drying process, and by twist, crook cupping and other defects after drying. To avoid these problems, it is required to lower the rate of drying, thus making it difficult to reduce the time for drying.

In dielectric heating, the interior of wood is heated simultaneously with the outer portion, but the moisture contained therein is removed through the wood by diffusion. Thus, if the wood is heated under severe conditions, it may degraded by cracking due to difference in the moisture content between the inner and outer portions.

SUMMARY OF THE INVENTION

It is an object of the present invention to provide a method for preservation treatment of wood, which makes it possible to impregnate wood with preservatives and/or modifiers uniformly and rapidly, without causing defects resulting from drying.

According to the present invention, there is provided a method for preservation treatment of wood, comprising the steps of radiating a laser beam on a part of the surface of the wood at the least to form small holes therein, impregnating the wood with a preservative, and then applying high frequency waves to the wood to dry it by dielectric heating.

The method of the present invention may be applied to any kind of wood and the wood to be treated may be in the form of log, square lumber, plate lumber, or any desired shape. The present invention is especially useful for impregnation of large-sized wood with the preservative as the time for penetration of the preservative and for drying are shortened by provision of small deep holes in the wood.

As a laser, there may be used any one of the conventionally known lasers such as gas-discharge lasers (e.g., $CO_2$ lasers), solid-state lasers, and the like. The holes may be formed in any desired diameter and depth by suitably controlling the output power of the laser and time for irradiating the laser beam. Small deep holes can be made easily by irradiating the laser beam on green wood or properly seasoned wood, thus making it possible to improve working efficiency. The number of holes per unit area of wood may vary widely, depending on the kind of wood to be treated and on the kind of chemicals to be impregnated.

Since use of laser beams makes it possible to cause minimum damage to surrounding areas, some undamaged cell walls are exposed to air through the holes and these tend to promote movement of liquid or gas in the wood. Thus, the small deep holes, which cannot be obtained by the conventional machining procedures such as incising, may promote penetration of preservative and removal of liquid or gas.

Materials for preservation treatment includes, for example, mothproofing agents, antiseptics, fire retardants and any conventionally used chemicals including oil-borne and water-borne chemicals. These materials may be used alone or in combination and may be in the form of a solution dissolved in an volatile solvent. Impregnation or the preservative may be accomplished by dipping, reduced-pressure impregnation, pressure impregnation or a combination thereof. Since the preservative penetrates into the wood through holes formed by a laser beam and through the surfaces of the wood, it is possible to uniformly impregnate the heartwood and sapwood with the preservative within a short time.

The present invention may be applied to timber for decorative laminated panels. In this case, it is preferred to provide holes which do not pass through the timber to be treated.

After being impregnated with the preservative, the wood is dried by dielectric heating. The dielectric heating is carried by applying high frequency waves or microwaves to the wood to be treated. The moisture contained in the interior of wood is directly heated by heat resulting from dielectric loss, and the vapor produced migrates to the surface and to the holes and emanates therefrom, thus making it possible to reduce the time required for drying as well as to minimize differences in the moisture content between the inner portion and outer portion of the wood. Accordingly, the wood is prevented from distorting and cracking after drying.

EXAMPLE

Seasoned heartwood of Japanese oak was cut into block specimens having the following sizes, with the long axis of the blocks parallel with the grain of the wood.

(A) 30 mm (thick) by 36 mm (wide) by 100 mm (long)

(B) 30 mm (thick) by 40 mm (wide) by 100 mm (long)

(C) 30 mm (thick) by 50 mm (wide) by 100 mm (long)

Separate from the above, seasoned heartwood of Japanese cedar was cut into block specimens having the following sizes, with the 100 mm dimension in the grain direction.

(D) 22 mm (thick) by 44 mm (wide) by 100 mm (long)

(E) 22 by 50 by 100 mm

Seasoned heartwood of Japanese cedar partially containing sapwood was cut into block specimen having the following size, with the 100 mm dimension in the grain direction.

(F) 22 mm (thick) by 46 mm (wide) by 100 mm (long)

The specimens (A), (B), (D) and (F) were respectively provided with 18 small holes in two rows (9 holes in each row) by radiating a laser beam on one face of a block specimen in the direction parallel to the thick direction of the wood with a $CO_2$ laser. The remaining five faces of the specimen were sealed with gum tape to prevent the specimen from impregnation by the liquid through its faces where no holes are provided.

Five faces of the specimens (C) and (E), except for one face corresponding to the bored faces of the specimens (A) and (D), were covered with gum tapes to prevent them from impregnation by the liquid.

The thus prepared specimens were respectively dipped in a 2.5 % aqueous solution of a preservative (Everwood boron, trade name) contained in a vessel, and then the vessel was placed in a treating chamber. The pressure in the treating chamber was reduced to 600 mm Hg, held for 30 minutes, increased to 15 atmospheres, and then held for 60 minutes. Each specimen was removed from the solution, wiped slightly to remove surface preservative solution, and then weighed to determine the gain in weight of the specimen corresponding to the amount of the preservative solution absorbed. Results are shown in Table 1.

TABLE 1

| Specimen | A | B | C | D | E | F |
|---|---|---|---|---|---|---|
| Gain (%) | 17.4 | 10.3 | 13.1 | 18.7 | 5.4 | 25.9 |

From the comparison of data for specimen (D) with that for specimen (E) shown in Table 1, it will be seen that the heartwood of Japanese cedar absorbs to the invention amount of preservative solution when processed according to the invention. Also, from the data for specimens (D) and (F), it will be seen that the sapwood portion of Japanese cedar takes the preservative treatment more readily than the heartwood portion. However, the specimen (A,B) for Japanese oak do not show a remarkable increase in weight even if it is provided with small holes.

Each specimen was then placed in and heated with an microwave radiating device (model NE-M325, made by Matsushita Electric Industrial Co., Ltd.) with a rated output of 500 W and an operating frequency of 2450 MHz. The specimens were weighed at 1 minute intervals to determine the decrease in weight. Results are shown in Table 2 as the change rate of weight in percentage.

TABLE 2

| | A | B | C | D | E | F |
|---|---|---|---|---|---|---|
| After 1 min | 3.8 | 7.1 | 3.2 | 4.9 | 2.1 | 7.6 |
| After 2 min | 8.1 | 12.0 | 6.0 | 10.6 | 4.3 | 13.2 |
| After 3 min | 9.7 | 16.1 | 10.7 | 15.2 | 6.0 | 20.1 |

From the above results, it will be seen that the rate of drying is increased by small holes and by use of dielectric heating.

Specimens were subjected to chemical color reaction test established by JAS (Japanese Agriculture Standard). The test samples were taken along the holes at 0, 1, 5 and 10 mm in depth from the face of the block specimen. Results are shown in Table 3. In Table 3, "good" means that the sample showed a good color reaction, "Δ" means that the sample showed color reaction partially, and "bad" means that the sample showed no color reaction.

TABLE 3

| | A | B | C | D | E | F |
|---|---|---|---|---|---|---|
| At 0 mm | good | good | good | good | good | good |
| 1 mm | good | good | good | good | good | good |
| 5 mm | good | good | Δ | Δ | bad | Δ |
| 10 mm | Δ | Δ | bad | Δ | bad | Δ |

From the data shown in Table 3, it will be seen that the small holes resulting from the radiation of the laser beam promotes the penetration of the preservative.

What is claimed is:

1. A method of preservation treatment of wood, comprising the steps of
   radiating a laser beam on a part of a surface of large, green wood or seasoned wood to form small deep holes in said wood so that some undamaged cell walls of said wood are exposed to air through each hole to promote movement of moisture from the interior of the wood,
   impregnating said wood at least through said holes with a preservative in the form of a liquid or a solution, to enable uniform impregnation, and then
   heating said wood with high frequency waves to remove the moisture contained therein.

2. A method of preservation treatment of wood according to claim 1, wherein said preservative is one or more materials selected from the group consisting of mothproofing agents, antiseptics, fire retardants, and oil-borne and water-borne chemicals.

* * * * *

UNITED STATES PATENT AND TRADEMARK OFFICE

CERTIFICATE OF CORRECTION

PATENT NO. : 5,075,131

DATED : December 24, 1991

INVENTOR(S) : Nobuaki Hattori, et al

It is certified that error appears in the above-identified patent and that said Letters Patent is hereby corrected as shown below:

On the cover page, under "References Cited", add the following:

OTHER PUBLICATIONS

Kamke, F.A., et al, Forest Products Journal, Vol. 40, No. 4, pp. 48-54 (April 1990)

Signed and Sealed this

Sixth Day of April, 1993

*Attest:*

STEPHEN G. KUNIN

*Attesting Officer* *Acting Commissioner of Patents and Trademarks*